Patented May 10, 1927.

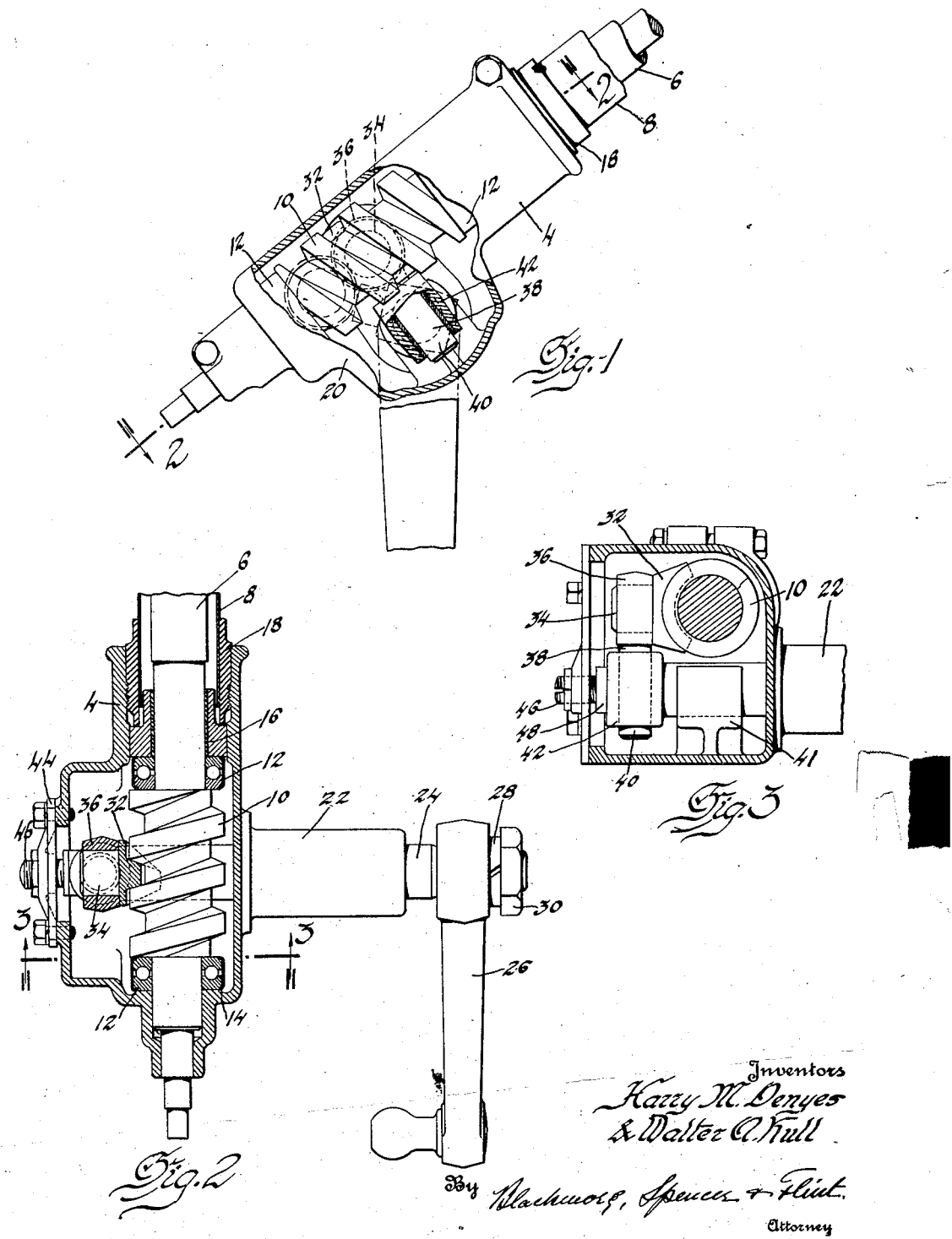

1,627,839

UNITED STATES PATENT OFFICE.

HARRY M. DENYES AND WALTER A. KULL, OF SAGINAW, MICHIGAN, ASSIGNORS TO GENERAL MOTORS CORPORATION, OF DETROIT, MICHIGAN, A CORPORATION OF DELAWARE.

STEERING GEAR.

Application filed September 11, 1925. Serial No. 55,751.

This invention relates to steering gear for vehicles.

It is an object of the invention to provide an improved gearing within the housing at the base of the steering column, connecting the worm on the steering post in driving relation with the usual rock shaft operating the steering wheels.

It is a further object to make use of parts in this gearing connection which are effective as driving elements, cheap to manufacture, convenient to assemble and easy to adjust.

With the above and other objects in view the invention is embodied in certain structure herein described and shown in drawing. It will be understood that various changes and modifications may be made within the scope of the appended claims.

In the drawing, Figure 1 is a side view of the gearing housing, a portion being broken away to illustrate the gearing.

Figure 2 is a longitudinal section on line 2—2 of Figure 1.

Figure 3 is a section on line 3—3 of Figure 2.

Referring to the drawing, numeral 4 represents an elongated housing to be secured to the chassis frame member by any convenient and suitable means. Extending through this housing is the usual steering post 6, enclosed above the housing by a steering column 8. The steering post 6 carries a worm 10, within the housing and above and below the worm are bearings 12. The lower bearing 12 is positioned between a shoulder member 14 of the housing and the lower end of the worm, while the upper bearing is located between the upper end of the worm and a sleeve 16 adjustable by means of the member 18 surrounding the column and screw threaded into the upper end of the gear housing.

On its lower side the gear housing has an off-set portion 20, having an angular cylindrical sleeve 22, constituting a tubular bearing for a rock shaft 24. At its outer end the rock shaft is tapered and fitted over the tapered end is the eye of a crank arm 26. The crank arm is held in position by a lock washer 28 and nut 30, as will be understood. At the opposite end of the crank arm is a ball member for connection with the steering wheels.

Within the housing and engaging the worm of the steering post is a segmental tooth member 32, having a stem 34 projecting away from the tooth. This part 32—34 reciprocates in the housing upon the rotation of the steering post. The stem 34 is received within an eye 36 of an intermediate eye bolt member 38, the stem portion 40 of which projects downwardly. The rock shaft 24 in addition to its bearing in sleeve 22 is guided in its rocking motion by a bearing 41, located within the housing. Beyond this bearing 41 the rock shaft is enlarged and provided with an opening at right angles to its longitudinal axis, thus forming an eye 42 through which passes the stem 40 referred to above. The housing is provided with a cover plate 44, the removal of which gives access to the gearing parts within the housing. The adjusting screw 46, is provided in the cover plate to engage a boss 48, on the inner end of the rock shaft. The adjustment of this screw, through the means of the intermediate parts 42, 38, 36 and 34 determines the adjustment of the tooth member 32 in its relation to the driving worm 10.

The operation will be understood from the above description. The rotation of the steering worm by the usual steering wheel causes a reciprocation of the tooth member 32. The stem 34 of this member as it reciprocally effects a rotary movement of the rock shaft by means of the intermediate member 38, which has a stem and eye engagement with the driven tooth member and also with the rock shaft.

The parts are easily assembled upon the removal of the cover plate and the gear adjustment is easily made from the outside by manipulating screw 46.

What we claim and desire to protect by Letters Patent is:

1. A steering shaft, gear teeth thereon, a member having teeth engaging the teeth of the steering shaft and a stud directed away from said teeth, said member being reciprocated by the rotation of the steering shaft, a rock shaft mounted at an angle to said steering shaft, said rock shaft having thereon a sleeve at an angle to its axis, an eye bolt having its stem slidable in the said sleeve and its eye mounted on said stud and means to adjust the engagement of the driving and driven teeth.

2. The invention defined by claim 1 said adjusting means including an adjustable member engaging the end of said rock shaft.

3. The invention defined by claim 1 said rock shaft mounted for axial movement said adjusting means including an adjustable member engaging the end of said rock shaft and extending through the wall of the housing for said gear.

In testimony whereof we affix our signatures.

H. M. DENYES.
WALTER A. KULL.